Figure 1:
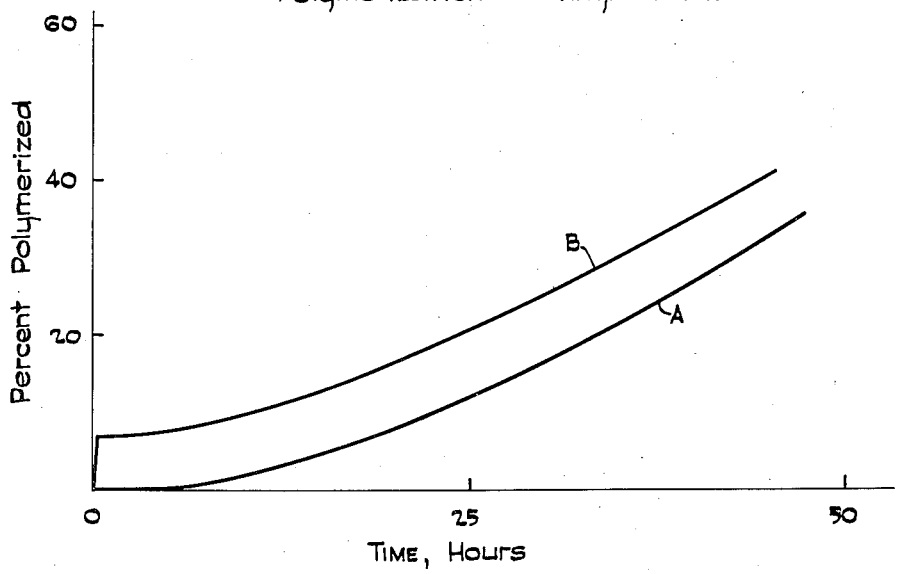

Polymerization of Vinyl Chloride

Polymerization of Methacrylonitrile

Inventor: Kenzie Nozaki

Patented Feb. 10, 1953

2,628,222

UNITED STATES PATENT OFFICE 2,628,222

METHOD OF POLYMERIZATION AND PRODUCTS PRODUCED THEREBY

Kenzie Nozaki, Richmond, Calif., assignor to Shell Development Company, San Francisco, Calif., a corporation of Delaware Application November 22, 1948, Serial No. 61,328

11 Claims. (Cl. 260—88.7)

This invention relates to the polymerization of polymerizable unsaturated organic compounds. More particularly the invention relates to a process for polymerizing monoolefinic compounds to produce polymers having a relatively high and uniform molecular weight, and to the polymers produced thereby.

Specifically the invention provides a practical and economical process for polymerizing monoolefinic compounds containing a terminal methylene group attached through an olefinic double bond to a carbon atom which is joined through single bonds to another carbon atom and to a side chain which is a member of the group consisting of halogen atoms and alkyl radicals, to produce polymers having a relatively high and uniform molecular weight which comprises heating the said monoolefinic compounds under specific conditions described hereinafter to an initial high temperature for a short period of time and then rapidly reducing the temperature to a lower temperature to complete the polymerization. The invention further provides polymers of the above-described monoolefinic compounds which possess many improved properties.

The ability of polymers of vinyl-type compounds to undergo successful fabrication depends to a great extent upon the molecular weight of the polymer particles. Polymers having a low molecular weight are difficult to mold and produce resins having poor mechanical properties. It is desired, therefore, to obtain polymers having a relatively high molecular weight. High molecular weight polymers are usually obtained by maintaining the monomeric unsaturated organic compounds at a low temperature in the presence of a polymerization catalyst but this method is defective in that it is very slow and the reaction must be continued for a considerable length of time before a reasonable yield is obtained. In addition, it has been found that during the latter part of the reaction there is formed a considerable number of new polymer nuclei which do not have an opportunity to grow to proper length, and as a result the finished product is made up of polymer particles having a great variety of different molecular weights. Polymers having such a wide range of molecular weights are difficult to mold and give rise to defective products.

It is, therefore, an object of the invention to provide a practical and economical method for polymerizing monoolefinic compounds to produce polymers having relatively high and uniform molecular weights. It is a further object to provide a method for the production of high molecular weight polymers of the above-described monoolefinic compounds which may be accomplished in a relatively short period of time. It is a further object to provide a method for the production of polymers of the above-described monoolefinic compounds which have a substantially uniform molecular weight. It is still a further object to provide polymers of the above-described monoolefinic compounds which possess many superior properties. Other objects of the invention will be apparent from the detailed description given hereinafter.

It has now been discovered that these and other objects may be accomplished by the novel process of the invention which comprises heating a monoolefinic compound containing a terminal methylene group attached through an olefinic double bond to a carbon atom which is joined through single bonds to another carbon atom and to a side chain which is a member of the group consisting of halogen atoms and alkyl radicals, under specific conditions described hereinafter, to an initial high temperature for a short period of time and then rapidly reducing the temperature to a lower temperature to complete the polymerization. This process is based on the discovery that when the members of this special group of monoolefinic compounds are subjected to an initial high temperature under conditions described below, they form many active polymer nuclei which have an indefinite life time. When the temperature of the mixture is reduced to a much lower range, the activity of the polymer nuclei continues and the monomers present in the reaction mixture readily add to the said active nuclei. As a majority of the active polymer nuclei is formed in a very short period of time during the high temperature phase, the polymer particles formed in the reaction will all have substantially the same molecular weight. The polymers produced by this novel process are easily fabricated and produce resins which are superior in their physical properties to resins produced from the polymers obtained from the conventional polymerization methods.

The discovery that this particular group of monoolefinic compounds formed polymer nuclei having an indefinite life time was indeed surprising for it had been previously considered that the polymer nuclei formed from monoolefinic compounds had a life span of only a few seconds. When many of the more common monoolefinic compounds, such as vinyl chloride, acrylonitrile, and methyl acrylate are heated to a high temperature for a short time and the temperature reduced, the active polymer nuclei formed in the reaction are readily terminated and the polymerization continues at the usual low temperature rates as shown in Example I.

The monomers which may be polymerized by the process of the invention are the members of the particular group of vinyl-type compounds which may be described as monoolefinic compounds which contain a terminal methylene group attached through an olefinic double bond to a carbon atom which is joined through single bonds to another carbon atom and to a side chain which is a member of the group consisting of halogen atoms and alkyl radicals. Examples of this group of monoolefinic compounds are 2-chloropropene-1, 2-methylbutene-1, 2-ethylbutene-1, alpha-chlorostyrene, methallyl chloride, methallyl acetate, ethallyl benzoate, alpha-chlorallyl caproate, 3-methallylcyclohexanone, alpha-chloro-4-ethylstyrene, alpha-chloroacrylonitrile, butyl 4-chloro-4-pentenoate, ethyl alpha-bromoacrylate, alpha-methyl-4-methoxystyrene, butyl alpha-chloroacrylate, 2-bromo-1-hepten-3-one, 4-methallylbenzonitrile, 4-chloro-4-pentenamide, 4-amyl-4-pentenamide, 4-butyl-4-penten-2-one, 4-iodo-4-pentenamide, 3-fluoro-3-butenenitrile, 3-chloro-3-butenenitrile, 5-isopropyl-5-hexenenitrile, 3-alpha-chlorovinyl-1-carbethoxycyclohexane, 4-methallyl-1-acetoxybenzene, 4-carbamyl-2-butyl-1-butene, alpha-methylvinylcyclopentane, beta - chlorallylbenzene, 4-carboxy-2-chloro-1-pentene, 4-methallylbenzamide, 3 - alpha - methylvinylcyclohexanamide, 2 - methallylcyclohexanecarboxamide, 7-ethallyl-2- naphthamide, 7-ethallyl-2-naphthonitrile, 2-alpha-ethyl-vinylcyclohexanenitrile, 4-ethallyl-2-cyclopentanenitrile, 3-methallyl-cyclopentanone, 3 - ethallyl - 1 - acetylbenzene. Preferred monomers to be polymerized by the process of the invention are the members of the group consisting of the monoolefinic compounds described above wherein the carbon atom attached directly to the terminal methylene group is attached to an alkyl side chain and to a hydrocarbon radical, a carbon atom of which, not more than 6 carbon atoms removed from the terminal methylene group, is attached to an ester radical, monoolefinic compounds described above wherein the carbon atom attached directly to the terminal methylene group is attached to an alkyl side chain and to a hydrocarbon radical a carbon atom of which, not more than 6 carbon atoms removed from the terminal methylene group, is attached to a —CN radical, the monoolefinic compounds described above wherein the carbon atom attached to the terminal methylene group is attached to an alkyl side chain and to a hydrocarbon radical a carbon atom of which, not more than 6 carbon atoms removed from the terminal methylene group, is attached to a carbonyl group, and the monoolefinic compounds described above wherein the carbon atom attached directly to the terminal methylene group is attached to an alkyl side chain and to a hydrocarbon radical a carbon atom of which, not more than 6 carbon atoms removed from the terminal methylene group, is attached to an amide radical.

The preferred monoolefinic compounds to be polymerized by the process of the invention may be exemplified by butyl 2-methyl-2-propenoate, ethyl 3-methyl-3-butenoate, isobutyl 4-ethyl-4-pentenoate, and amyl 4-butyl-4-pentenoate, methallyl acetate, ethallyl benzoate, 2-methyl-2-propenenitrile, 3-ethyl-3-butenenitrile, 4-butyl-4-pentenenitrile, 2-methallyl-1-carboethoxybenzene, 3-ethallyl-2-naphthamide, 5-isopropyl-5-hexenenitrile, 2-methyl-2-propenamide, 3-ethyl-3-butenamide, 3-butyl-3-butenamide, 2-methallylbenzonitrile, 4 - isobutyl - 4 - pentenamide, and 4-amyl-4-pentenamide, 3-methyl-3-buten-2-one, 3-ethyl-3-buten-2-one, 2-methallylcyclohexanone, 4-butyl-4-penten-2-one, 4-isopropyl-4-penten-3-one, 5-amyl-5-penten-2-one, and 5-ethyl-5-penten-4-one.

A particularly preferred group of monoolefinic compounds to be polymerized by the process of the invention are those of the general formula

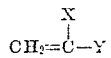

wherein X is an alkyl radical containing from 1 to 5 carbon atoms and Y is a member of the group consisting of —(CH$_2$)$_n$CN radicals wherein $n$ is an integer from 0 to 5,

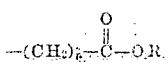

radicals wherein $n$ is an integer from 0 to 5 and R is an alkyl radical containing from 1 to 6 carbon atoms,

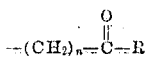

radicals wherein $n$ is an integer from 0 to 5 and R is an alkyl radical containing from 1 to 6 carbon atoms,

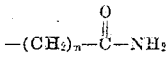

radicals wherein $n$ is an integer from 0 to 5. Examples of the alkyl radical represented by R in the above-described formula are methyl, ethyl, propyl, isopropyl, butyl, isobutyl, amyl, hexyl, and the like.

Examples of the particularly preferred group of monoolefinic compounds to be polymerized by the process of the invention are methacrylonitrile, methyl methacrylate, amyl 4-butyl-4-pentenoate, 4-butyl-4-pentenenitrile, 5-isopropyl-5-hexenenitrile, 4-isobutyl-4-pentenamide, 4-amyl-4-pentenamide, 3-methyl-3-buten-2-one, and 4-isopropyl-4-penten-3-one.

Any polymerization conditions may be employed during the polymerization of the above-described monoolefinic compounds provided they permit the formation of the long-lived polymer radicals. If a solvent is employed during the polymerization, it must be a poor solvent for the finished polymer or very few of the long-lived polymer radicals will be formed. Examples of such solvents which may be used depending upon the particular monomer being polymerized are water, cyclohexanone, cyclohexane, butane, hexane, and the like. If a polymerization catalyst is employed, it should be utilized in only relatively small concentrations as high catalyst concentrations are detrimental to the formation of long-lived polymer radicals. Examples of the polymerization catalysts that may be employed are the peroxides, such as benzoyl peroxide, acetyl peroxide, hydrogen peroxide, tert-butyl peroxide, the peracids, such as persulfuric acid, peracetic acid, and perphthalic acid; the per-salts, such as potassium persulfate, the per-esters, such as tert-butyl perbutyrate, and the like. In most cases the amount of catalyst should not exceed 1.5% by weight of the monomer being polymerized but the exact amount of catalyst that can be tolerated in the process may best be deducted for each case by routine determination.

In most cases molecular oxygen will tend to inhibit long-lived polymer radical formation and it is desirable to exclude the said oxygen from the reaction. The removal of the oxygen may be accomplished by any suitable method. It is preferably accomplished by freezing the mixture and evacuating the reaction chamber by means of a pump. In some cases it may be desirable to replace the withdrawn oxygen with an inert gas, such as nitrogen, methane, carbon dioxide, and the like.

Light is also preferably excluded from the reaction as its presence in some cases gives rise to the formation of polymers having less uniform molecular weights.

The initial high temperature to which the reaction mixture is to be heated will vary over a considerable range depending upon the presence or absence of catalysts, the type of monomer or monomers being polymerized, etc. If catalysts are employed the temperature used will depend on the decomposition temperature of the said catalyst as the rate of formation of the long-lived polymer radicals depends in part upon the decomposition of the catalyst. If no catalyst is employed the temperature will usually be governed by the type of monomer or monomers employed, some monomers being polymerized at much lower temperatures than others. Temperatures employed should, however, always be below the decomposition temperature of the monomers being polymerized. In general, temperatures between 90° C. and the decomposition temperatures of the monomers will be sufficient to bring about the desired formation of the long-lived polymer radicals. Preferred temperatures vary from 90° C. to 150° C.

The period of exposure of the polymerizable mixture to the initial high temperature will depend upon the specific temperature employed and the type of monomer being polymerized. The period should be as short as possible, however, in order to insure that all of the long-lived polymer radicals are formed at about the same time and have an opportunity to grow to the same length. In most cases when temperatures within the preferred range of 90° C. to 150° C. are employed the period of exposure to the initial high temperature will vary between 4 to 10 minutes. Slightly longer or shorter periods may be used, however, if desired or necessary.

The reduction of the temperature to the lower range should be accomplished as rapidly as possible in order to prevent the possibility of polymer nuclei being formed during the intermediate temperature range. The reduction of the temperature may be accomplished by means well known in the art, such as the use of ice baths, etc.

The temperature to which the reaction mixture is to be reduced after the exposure to the initial high temperature may vary over a considerable range depending upon the type of monomer to be polymerized. If the monomer is one which ordinarily polymerizes quite rapidly, relatively low temperatures, such as of the order of −10° C. to +10° C. may be employed. If the monomer is one that is quite difficult to polymerize, higher temperatures, such as of the order of 20° C. to 25° C., may be needed to obtain a reasonable polymerization rate. Preferred low temperatures range from 0° C. to 25° C. As this type of polymerization is usually exothermic it may be necessary to apply means, such as cold water condensers, etc. to maintain the reaction at the desired low temperature.

At the completion of the reaction the polymer may be separated from the reaction mixture by any suitable means, such as filtration, coagulation, and the like.

It is preferred to accomplish the polymerization in an aqueous emulsion as the required conditions for the production of the long-lived polymer radicals are more easily obtained by that method. According to this process the monomer to be polymerized is combined with a mixture of water, emulsifying agent and preferably a polymerization catalyst, maintained in the desired ratio and the resulting mixture subjected to the elevated temperature for the short period of time and then rapidly reduced to the lower temperature to complete the polymerization.

Emulsifying agents that may be employed in the preferred polymerization procedure includes the soaps, such as sodium and potassium myristate, laurate, palmitate, oleate, stearate, rosinate, and hydroabietate; the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher amines like lauryl amine hydrochloride, and stearyl amine hydrobromide.

The amount of the emulsifying agent to be employed in the polymerization mixture will vary over a considerable range depending upon the particular material being polymerized, the amount of water present in the mixture and the type and amount of other ingredients added thereto. In general, the amount will vary from 0.1% to 5% by weight of monomer. The preferred amount of the emulsifying agent to be employed will vary between 0.1% to 1% by weight of monomer.

Catalysts that may be used in the preferred polymerization process, if desired, are exemplified by peracid catalysts, such as persulfuric acid, peracetic acid, and perphthalic acid; the per-salts, such as potassium persulfate; the per-esters, such as tert-butyl perbutyrate, di-tert-butyl dipermalonate and the peroxide catalysts, such as hydrogen peroxide, acetyl peroxide, succinyl peroxide, and sodium peroxide. Mixtures of catalysts may also be employed.

The amount of the catalysts to be employed in the aqueous emulsion may vary over a considerable range but should not exceed the maximum which results in prevention of formation of the long-lived radicals. In most cases amounts of catalysts should not exceed 1.5% by weight of the monomer being polymerized. A preferred range of catalyst will be between .01% to 1% by weight.

It is usually desirable to maintain a low ratio between the amount of monomer and amount of water present in the initial aqueous emulsion, e. g. between 1:2 to 1:5, preferably 1:3. With lower phase ratios there is more monomer available per long-lived radical and the polymer chain is able to grow to a higher molecular weight.

Various other ingredients may be added to the aqueous emulsion before or during the polymerization process. These ingredients include emulsion stabilizers such as polysaccharides, gum arabic, soluble starch, dextrine, lubricants, dyes and pigments. Plasticizers for the resins, such as dioctyl phthalate may also be added. The nature and amount of the modifier and stabilizer will depend upon the particular monoolefinic compound being polymerized and upon the intended use of the final product.

The aqueous emulsion containing the monomer and emulsifying agent, and catalyst if desired, is heated to the initial high temperature, preferably a temperature between 90° C. to 150° C. for the short period of time, preferably between 5 to 10 minutes and then the temperature of the emulsion is lowered preferably to 25° C. or below, to complete the polymerization.

The polymers will be formed in the aqueous emulsion as a latex which may be separated from the reaction mixture by any suitable means comprising coagulation with electrolytes, solvents, freezing and the like.

The polymerization reaction may be executed in any convenient type of apparatus enabling the maintenance of the proper polymerization conditions. The process may be carried out in batch, semi-continuous or continuous manner. For large scale production it is preferred to conduct the process in a continuous manner. This operation is particularly desirable as it permits the maintenance of more stable conditions.

To illustrate the manner in which the invention may be carried out the following examples are given. It is to be understood, however, that the examples are for the purpose of illustration and are not to be regarded as limiting the invention in any way.

In each of the following experiments the reaction was accomplished in the substantial absence of oxygen. This was accomplished either by withdrawing the air from the reaction chamber or by bubbling nitrogen through the reaction mixture. The experiments were also accomplished in the absence of light.

The polymers were coagulated by freezing at —20° C. or by precipitation with sodium chloride at 90° C.

The polymers of methacrylonitrile were fractionated by dissolving samples of the polymer in a mixture of 1100 parts of acetone and 160 parts of isopropanol and slowly adding 75 to 100 parts of 1:1 mixture of acetone and isopropanol. The precipitate was allowed to settle for 24 hours and then separated. To the supernatant liquid was added 30 to 50 parts of the same mixture of acetone and isopropanol and the precipitate formed was again separated. The supernatant liquid was again subjected to precipitation as described above.

Example I (a) About 100 parts of vinyl chloride were mixed with 300 parts of water, 0.6 part of sodium lauryl sulfate, .03 part of potassium persulfate, 0.6 part sodium acetate and 0.6 part of acetic acid and the resulting mixture emulsified and maintained at 25° C. The per cent of vinyl chloride polymerized was determined at various periods and the results plotted on the graph shown in Figure 1, line A.

(b) An aqueous emulsion containing the same ingredients and proportions as shown in (a) above was heated to 100° C. for 2 minutes and the temperature then rapidly lowered to 25° C. The per cent of vinyl chloride polymerized was determined at various periods and the results plotted on the graph in Figure 1, line B. The results indicate that there was a formation of about 7% polymer during the two minutes at 100° C. and when the temperature was reduced to 25° C. the rate of polymerization fell back to and paralleled the auto-catalytic rate curve produced in (a) above.

Figure 2:
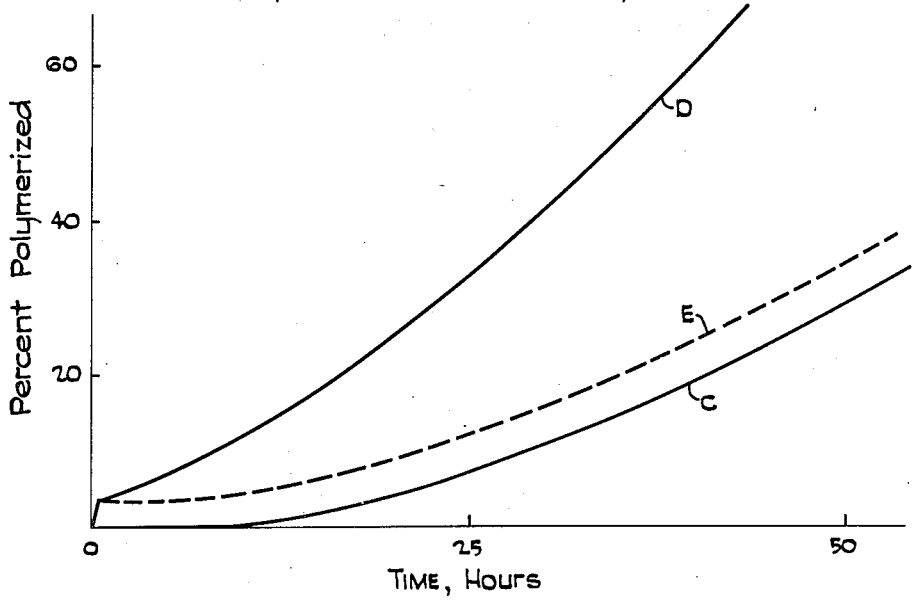

(c) About 100 parts of methacrylonitrile were mixed with 300 parts of water, 1 part sodium lauryl sulfate, and 1 part potassium persulfate, and the resulting mixture emulsified and maintained at 25° C. The per cent methacrylonitrile polymerized was determined at various periods and the results plotted on the graph shown in Figure 2, line C. The results indicate that the polymerization of the methacrylonitrile at 25° C. is auto-catalytic and follows a curve very similar to that of vinyl chloride.

(d) An aqueous emulsion containing the same ingredients and proportions as shown in (c) above was heated to 100° C. for 6 to 8 minutes and the temperature then rapidly reduced to 25° C. The per cent methacrylonitrile polymerized was determined at various periods and the results plotted on the graph in Figure 2, line D. The results show that there was a formation of about 4% polymer during the 6 to 8 minutes at 100° C. and when the temperature was reduced to 25° C. the polymer formation continued at a very rapid rate.

The fact that the reaction mixture continued to polymerize at a rapid rate after the temperature had been reduced was quite surprising as it was expected that as soon as the temperature was reduced to 25° C. the rate of polymerization would follow the course indicated by line E and fall back to and parallel the auto-catalytic curve C as was the case with the vinyl chloride. Under the conditions employed the sudden change in the course of the polymerization after the high temperature initiation can only be attributed to the fact that in the case of methacrylonitrile the high temperature initiation results in the formation of long-lived polymer radicals which continue to grow after the temperature has been reduced.

(e) The molecular weight and uniformity of particle size were determined for the polymethacrylonitrile formed in (c) and (d) above. The polymethacrylonitrile formed by the polymerization at 25° C. in (c) had a molecular weight of $1.5 \times 10^6$ and was composed of a variety of different size particles. The polymethacrylonitrile formed by the high temperature initiation process of (d) possessed a molecular weight of $2 \times 10^6$ and was composed of particles of substantially the same size.

Example II

About 100 parts of methyl methacrylate were mixed with 300 parts of water, 1 part sodium lauryl sulfate, and .3 part potassium persulfate and the resulting mixture emulsified and heated at 100° C. for 6 to 8 minutes and then rapidly lowered to 25° C. to complete the polymerization. In this case also there was a rapid increase in the per cent polymer formed after the temperature had been reduced to 25° C. indicating that methyl methacrylate is also able to form the long-lived polymer radicals at the high temperature. An analysis of the resulting polymethyl methacrylate indicated that the polymer had a high and very uniform molecular weight.

Example III

About 100 parts of ethyl alpha-butylacrylate are mixed with 300 parts of water, 1 part sodium lauryl sulfate, and the resulting mixture emulsified and heated at 125° C. for 6 to 8 minutes and then reduced to 25° C. to complete the polymerization. The resulting polymer has a relatively high and uniform molecular weight.

Example IV

About 100 parts of 2-butyl-1-buten-3-one are mixed with 300 parts of water, 1 part sodium lauryl sulfate, and 1 part potassium persulfate and the resulting mixture emulsified and heated at 100° C. for 6 to 8 minutes and then reduced to 25° C. to complete the polymerization. The resulting polymer possesses a relatively high and uniform molecular weight.

Example V

About 100 parts of methyl alpha-chloroacrylate are mixed with 300 parts of water, 1 part sodium lauryl sulfate and the resulting mixture emulsified and heated at 90° C. for 10 minutes and then reduced to 10° C. to complete the polymerization. The resulting polymer has a high and uniform molecular weight.

Example VI

About 100 parts of alpha-bromostyrene are mixed with 300 parts of water, 1 part sodium lauryl sulfate, and 1 part of potassium persulfate and the mixture heated at 105° C. for 10 minutes and then reduced to 25° C. to complete the polymerization. Poly(bromostyrene) obtained by this method has a high and very uniform molecular weight.

I claim as my invention:

1. A process for polymerizing methacrylonitrile which comprises heating an aqueous emulsion containing 100 parts by weight of monomeric methacrylonitrile as the sole polymerizable component and 200 to 500 parts by weight of water, 0.1% to 1% by weight of monomer of a polymerization catalyst, and 0.1% to 1% by weight of monomer of an emulsifying agent to a temperature between 90° C. and 150° C. for 5 to 10 minutes, rapidly cooling the mixture to a temperature between 0° C. and 25° C. and maintaining the mixture in that temperature range to complete the polymerization and then recovering the formed polymethacrylonitrile from the reaction mixture.

2. A process for polymerizing methyl methacrylate which comprises heating an aqueous emulsion containing 100 parts by weight of monomeric methyl methacrylate as the sole polymerizable component and 200 to 500 parts by weight of water, 0.1% to 1% by weight of monomer of a polymerization catalyst, and 0.1% to 1% by weight of monomer of an emulsifying agent to a temperature between 90° C. and 100° C. for 5 to 10 minutes, rapidly cooling the mixture to a temperature between 0° C. and 25° C. and maintaining the mixture in that temperature range to complete the polymerization, and then recovering the formed poly(methyl methacrylate) from the reaction mixture.

3. A process for polymerizing a monoolefinic compound containing a terminal methylene group which is attached through an olefinic double bond to a carbon atom which is joined through single bonds to another carbon atom and to a side chain comprising a member of the group consisting of halogen atoms and alkyl radicals, which comprises heating an aqueous emulsion containing 100 parts by weight of the said monoolefinic compound as the sole polymerizable component and 200 to 500 parts by weight of water, 0.01% to 1.5% by weight of monomer of a polymerization catalyst, and 0.1% to 5% by weight of monomer of an emulsifying agent to a temperature above 90° C. and below the decomposition temperature of the said monoolefinic compound for a few minutes, rapidly cooling the mixture to a temperature between −10° C. and 25° C. and maintaining the mixture in that low temperature range to complete the polymerization, and then recovering the formed homopolymer of the monoolefinic compound from the reaction mixture.

4. A process for polymerizing methacrylonitrile which comprises heating an aqueous emulsion containing monomeric methacrylonitrile as the sole polymerizable component to a temperature between 90° C. and 150° C. for 5 to 10 minutes, rapidly cooling the mixture to a temperature between −10° C. and 25° C., and maintaining the mixture in that temperature range to complete the polymerization and then recovering the formed polymethacrylonitrile from the reaction mixture.

5. A process for polymerizing methacrylonitrile which comprises heating a liquid medium which is a poor solvent for polymethacrylonitrile and which contains the said methacrylonitrile as the sole polymerizable component to a temperature between 90° C. and the decomposition temperature of methacrylonitrile so as to form a substantial quantity of polymer nuclei, cooling the mixture to a temperature range below the minimum temperature at which any substantial further quantity of polymethacrylonitrile long-lived free radicals is formed but above −10° C., and maintaining the mixture in that temperature range to complete the polymerization.

6. A process for polymerizing a monoolefinic compound containing a terminal methylene group which is attached through an olefinic double bond to a carbon atom which is joined through single bonds to another carbon atom and to a member of the group consisting of halogen atoms and alkyl radicals, which comprises briefly heating a liquid medium which is a poor solvent for the resulting polymer and contains the said monoolefinic compound as the sole polymerizable component, at a temperature above about 90° C. thereby effecting the rapid formation of polymer nuclei of the said monoolefinic compound, then cooling the mixture containing said nuclei to a lower temperature range below about 90° C. thereby arresting the formation in any substantial quantity of new polymer nuclei, and then maintaining the mixture within said lower range of temperature to complete the polymerization, and then recovering the formed homopolymer of the monoolefinic compound from the reaction mixture.

7. A process as defined in claim 6 wherein the monoolefinic compound is a monomer of the formula

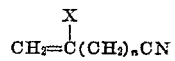

wherein X is an alkyl radical containing from 1 to 5 carbon atoms and $n$ is an integer from 0 to 5.

8. A process as defined in claim 6 wherein the monoolefinic compound is a monomer of the formula

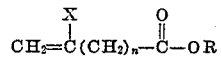

wherein X is an alkyl radical containing from 1 to 5 carbon atoms, R is an alkyl radical containing from 1 to 6 carbon atoms and $n$ is an integer from 0 to 5.

9. A process as defined in claim 6 wherein the monoolefinic compound is a monomer of the formula

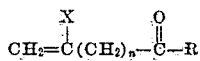

wherein X is an alkyl radical containing from 1 to 5 carbon atoms, R is an alkyl radical containing from 1 to 6 carbon atoms and $n$ is an integer from 0 to 5.

10. A process as defined in claim 6 wherein the liquid medium in which the polymerization is accomplished is an aqueous emulsion.

11. A process as in claim 6 wherein the polymerization is conducted in an inert atmosphere.

KENZIE NOZAKI.

REFERENCES CITED

The following references are of record in the file of this patent:

UNITED STATES PATENTS

| Number | Name | Date |
|---|---|---|
| 1,710,825 | Herrmann et al. | Apr. 30, 1929 |
| 2,375,256 | Soday | May 8, 1945 |
| 2,395,344 | Schoenfeld | Feb. 19, 1946 |